(12) United States Patent
Makihira

(10) Patent No.: US 7,602,432 B2
(45) Date of Patent: Oct. 13, 2009

(54) SOLID-STATE IMAGING ELEMENT AND SOLID-STATE IMAGING DEVICE

(75) Inventor: Toshihisa Makihira, Fukuoka (JP)

(73) Assignee: Sony Corporation, Tokyo (JP)

( * ) Notice: Subject to any disclaimer, the term of this patent is extended or adjusted under 35 U.S.C. 154(b) by 520 days.

(21) Appl. No.: 11/558,232

(22) Filed: Nov. 9, 2006

(65) Prior Publication Data
US 2007/0195184 A1   Aug. 23, 2007

(30) Foreign Application Priority Data
Nov. 11, 2005   (JP) .......................... P2005-328024

(51) Int. Cl.
*H04N 5/335* (2006.01)
(52) U.S. Cl. .................... 348/316; 348/312; 348/315
(58) Field of Classification Search ................ 348/316, 348/311, 315, 312, 294
See application file for complete search history.

(56) References Cited

U.S. PATENT DOCUMENTS 5,486,859 A * 1/1996 Matsuda ..................... 348/311
6,002,146 A * 12/1999 Nakagawa et al. .......... 257/231

FOREIGN PATENT DOCUMENTS

| JP | 59-013369 | 1/1984 |
|----|-----------|--------|
| JP | 62-238666 | 10/1987 |
| JP | 01-168060 | 7/1989 |
| JP | 06-105239 | 4/1994 |
| JP | 08-097397 | 4/1996 |

OTHER PUBLICATIONS

A Japanese Office Action dated Oct. 28, 2008 issued in connection with counterpart Japanese Patent Application No. 2005-328024.

* cited by examiner

*Primary Examiner*—Tuan V Ho
*Assistant Examiner*—Yih-Sien Kao
(74) *Attorney, Agent, or Firm*—Sonnenschein Nath & Rosenthal LLP

(57) ABSTRACT

A solid-state imaging element includes an imaging element area, a first horizontal transfer register, a second horizontal transfer register, a first transfer channel, a second transfer channel, and a channel stop region.

4 Claims, 12 Drawing Sheets

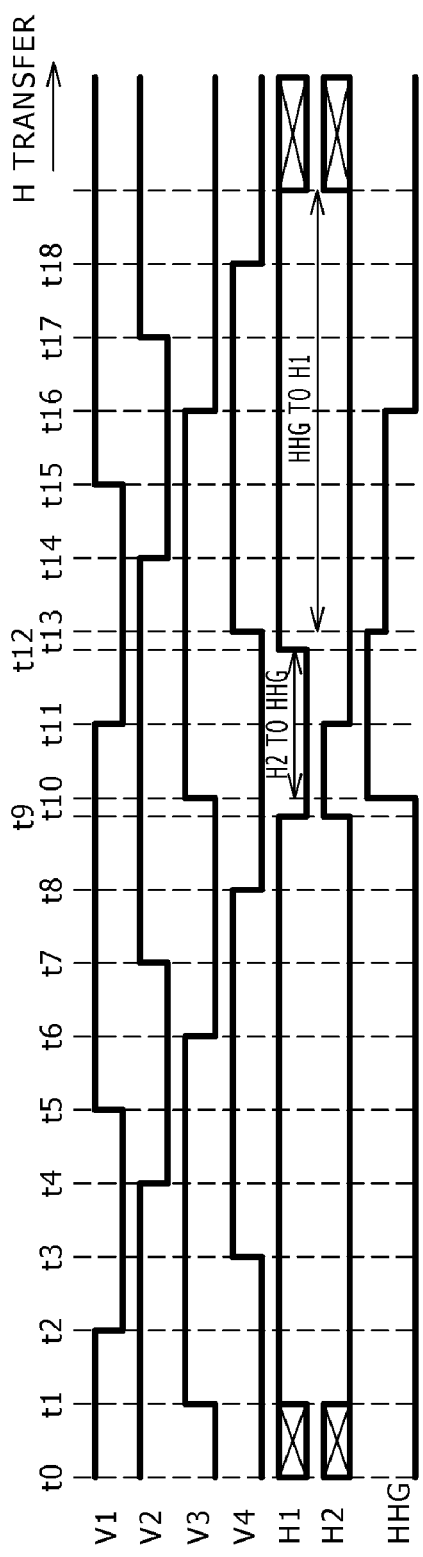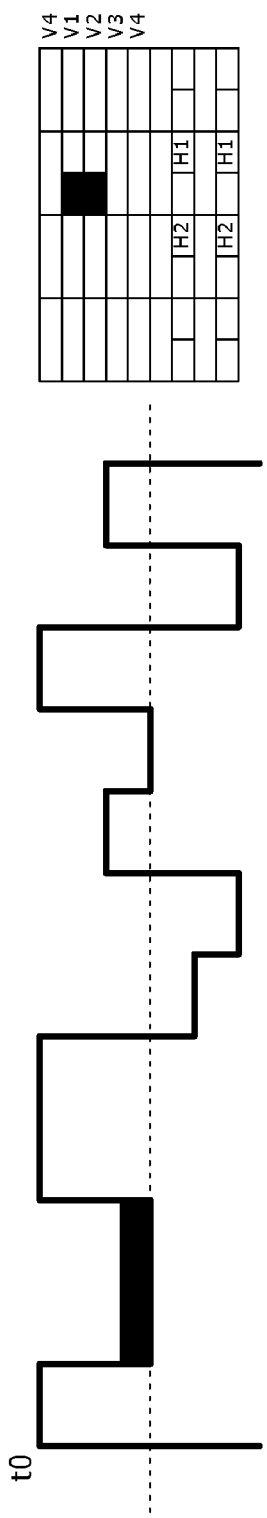
FIG. 4A
FIG. 4B

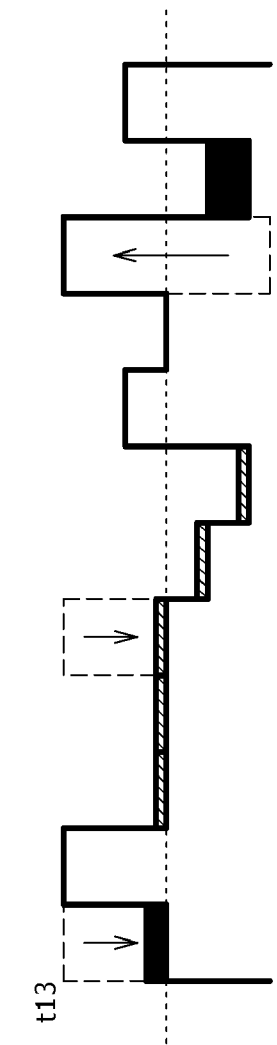
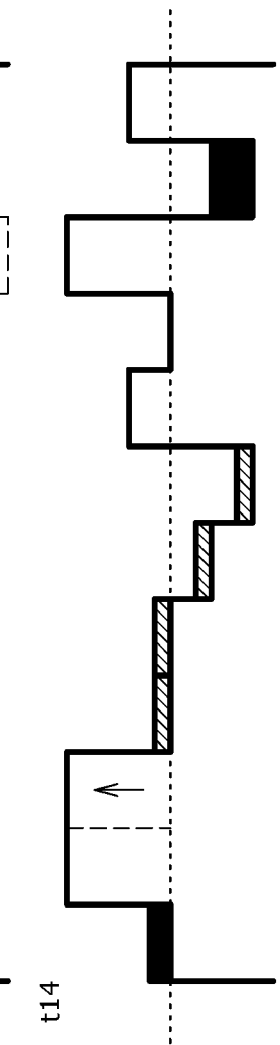
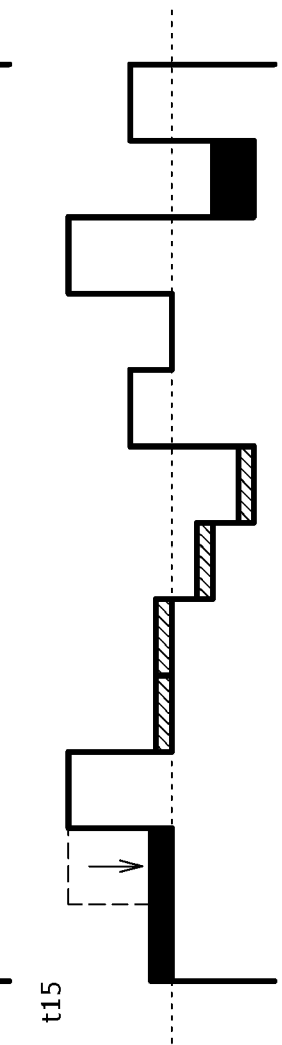
FIG. 9A
FIG. 9B
FIG. 9C

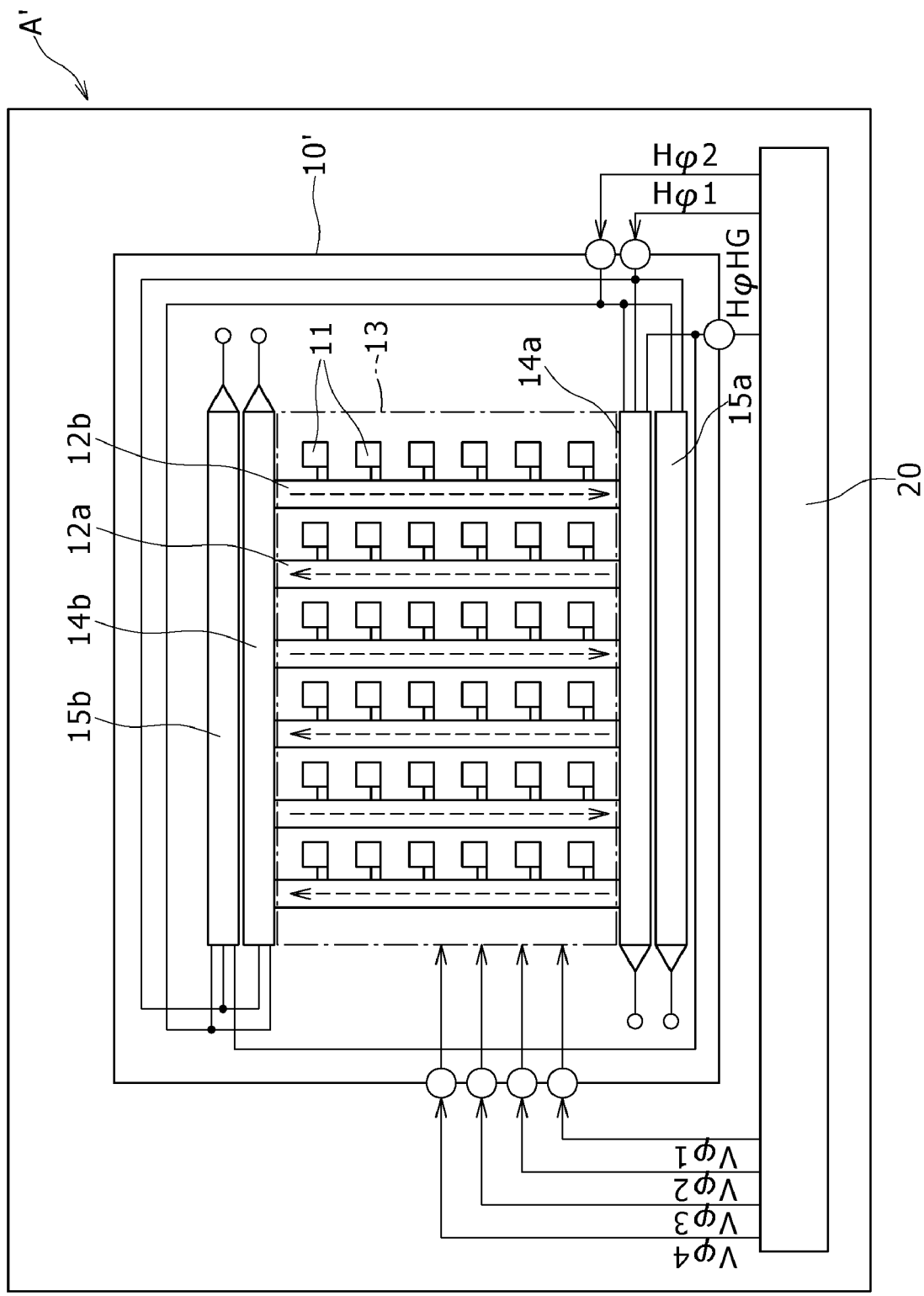

SOLID-STATE IMAGING ELEMENT AND SOLID-STATE IMAGING DEVICE

CROSS REFERENCES TO RELATED APPLICATIONS

The present invention contains subject matter related to Japanese Patent Application JP 2005-328024 filed with the Japanese Patent Office on Nov. 11, 2005, the entire contents of which being incorporated herein by reference.

BACKGROUND OF THE INVENTION

1. Field of the Invention

The present invention relates to solid-state imaging elements and solid-state imaging devices, and particularly to a charge-coupled device (CCD) solid-state imaging element and a CCD solid-state imaging device that include a plurality of horizontal transfer registers.

2. Description of the Related Art

An existing CCD solid-state imaging element includes, on a semiconductor substrate, plural photosensors that are two-dimensionally arranged vertically and horizontally, plural vertical transfer registers provided adjacent to these photosensors, and a horizontal transfer register provided adjacent to one ends of these vertical transfer registers. In the CCD solid-state imaging element, signal charges arising from photoelectric conversion in the respective photosensors in response to light reception thereof are transferred by the vertical transfer registers and horizontal transfer register.

An output amplifying circuit is provided at the end terminal of the horizontal transfer register. The output amplifying circuit is configured to be capable of outputting the voltage corresponding to signal charges transferred from the horizontal transfer register, and outputs signal charges accumulated in the respective photosensors as a voltage signal.

Solid-state imaging devices including such solid-state imaging elements are demanded to have higher performance. Therefore, in solid-state imaging elements used in solid-state imaging devices, great importance has been attached to property improvements such as an increase in the number of pixels and an enhancement in the frame rate.

If the number of pixels in a solid-state imaging element is increased in particular, the number of photosensors formed on a semiconductor substrate is also increased and thus the frame rate is decreased. The frame rate decrease possibly leads to lowering of usability of the solid-state imaging device at the time of use thereof, such as difficulty in shortening of the imaging interval and setting a large maximum number of continuous shooting frames.

To address this, in recent years, methods in which plural horizontal transfer registers are disposed in parallel to each other have been employed for achievement of a larger number of pixels in a solid-state imaging element. Examples of the methods include a method in which signal charges on an odd-numbered horizontal line and signal charges on an even-numbered horizontal line are transferred by separate horizontal transfer registers, and a method in which signal charges on the same horizontal line are transferred by plural horizontal transfer registers.

FIG. 13 is a schematic diagram of a solid-state imaging element 100a in which signal charges of plural horizontal lines are transferred by separate horizontal transfer registers. This solid-state imaging element 100a includes a first horizontal transfer register 110a that horizontally transfers signal charges transferred from plural vertical transfer registers 101a and a second horizontal transfer register 111a that horizontally transfers signal charges transferred from the plural vertical transfer registers 101a via the first horizontal transfer register 110a. In the solid-state imaging element 100a, signal charges on an odd-numbered horizontal line and signal charges on an even-numbered horizontal line are simultaneously transferred by these separate horizontal transfer registers 110a and 111a so that the signal charges of two lines are read out within 1H (horizontal scanning period), to thereby achieve a higher frame rate (refer to e.g. Japanese Patent Laid-open No. Hei 6-105239).

FIG. 14 is a schematic diagram of a solid-state imaging element 100b in which signal charges on the same horizontal line are transferred by plural horizontal transfer registers. This solid-state imaging element 100b includes a first horizontal transfer register 110b that horizontally transfers signal charges transferred from vertical transfer registers 101b on odd-numbered vertical lines and a second horizontal transfer register 111b that horizontally transfers signal charges transferred from the vertical transfer registers 101b on even-numbered vertical lines via the first horizontal transfer register 110b. In the solid-state imaging element 100b, signal charges on odd-numbered vertical lines and signal charges on even-numbered vertical lines are simultaneously transferred by these separate horizontal transfer registers 110b and 111b so that the amount of signal charges horizontally transferred in 1 H by each of the horizontal transfer registers 110b and 111b is small, to thereby achieve a higher frame rate.

SUMMARY OF THE INVENTION

In the solid-state imaging element in which plural horizontal transfer registers are disposed in parallel to each other and signal charges are transferred between the horizontal transfer registers, if the efficiency of the transfer between the horizontal transfer registers is low, image signals output from the solid-state imaging element are adversely affected.

FIG. 15A shows a plane pattern in an existing solid-state imaging element 100. Note that FIG. 15A shows only part of a first horizontal transfer register 110 and a second horizontal transfer register 111 for a simplified explanation. The horizontal transfer register unit in the solid-state imaging element 100 is composed of the first horizontal transfer register 110 and the second horizontal transfer register 111. The first horizontal transfer register 110 horizontally transfers signal charges transferred from plural vertical transfer registers in an imaging element area (not shown) by first transfer parts 121 and second transfer parts 122 that are alternately disposed along the horizontal transfer direction. The second horizontal transfer register 111 horizontally transfers signal charges transferred from plural vertical transfer registers via the first horizontal transfer register 110 by third transfer parts 123 and fourth transfer parts 124 that are alternately disposed along the horizontal transfer direction.

A first transfer channel 130 is provided between the first transfer part 121 and the vertical transfer register. A second transfer channel 131 is provided between the first transfer part 121 and the fourth transfer part 124. Furthermore, a channel stop region 151 is provided between the first transfer part 121 and the third transfer part 123, while a channel stop region 152 is provided between the second transfer part 122 and the imaging element area (image area).

In this solid-state imaging element 100, signal charges are transferred from the first horizontal transfer register 110 to the second horizontal transfer register 111 by the following procedure. Specifically, signal charges are transferred from the vertical transfer register via the first transfer channel 130 to the first transfer part 121, and then are transferred via the second transfer channel 131 to the fourth transfer part 124, followed by being moved to the third transfer part 123.

FIG. 15B shows the potential state across the section along line A-A' in FIG. 15A. FIG. 15B is a typically employed diagram for showing the correlation between a section of a semiconductor element and the potential. The lower side in this diagram corresponds to a deeper potential (higher potential). Furthermore, the slope angle of the curve indicates the intensity of an electric field. If the slope is steep, electrons as signal charges, which have a negative potential, are moved by the Coulomb force in the direction toward a deeper potential. As shown in this diagram, the electric field of part a1 is weak, and hence there is part in which the potential slope is gentle between points A to A'.

There is a need for the present invention to provide a solid-state imaging element that is allowed to have an enhanced electric field and thus an improved efficiency of transfer between horizontal transfer registers so as to achieve a higher frame rate, and a solid-state imaging device including the solid-state imaging element.

According to a first embodiment of the present invention, there is provided a solid-state imaging element. The solid-state imaging element includes an imaging element area configured to include a plurality of two-dimensionally arranged photosensors and a plurality of vertical transfer registers that vertically transfer a signal charge arising from photoelectric conversion by the plurality of photosensors for each vertical column of the two-dimensionally arranged photosensors, a first horizontal transfer register configured to horizontally transfer a signal charge transferred from the plurality of vertical transfer registers by a first transfer part and a second transfer part that are alternately disposed along a horizontal transfer direction, and a second horizontal transfer register configured to horizontally transfer a signal charge transferred from the plurality of vertical transfer registers via the first horizontal transfer register. The solid-state imaging element further includes a first transfer channel configured to be provided between the first transfer part and the vertical transfer register, a second transfer channel configured to be provided between the second transfer part and the second horizontal transfer register, and a channel stop region configured to be provided between the second transfer part and the imaging element area. In the solid-state imaging element, a signal charge transferred from the vertical transfer register via the first transfer channel to the first transfer part is transferred via the second transfer part to the second horizontal transfer register.

According to a second embodiment of the invention, there is provided a solid-state imaging device. The solid-state imaging device includes a solid-state imaging element that includes an imaging element area configured to include a plurality of two-dimensionally arranged photosensors and a plurality of vertical transfer registers that vertically transfer a signal charge arising from photoelectric conversion by the plurality of photosensors for each vertical column of the two-dimensionally arranged photosensors, a first horizontal transfer register configured to horizontally transfer a signal charge transferred from the plurality of vertical transfer registers by a first transfer part and a second transfer part that are alternately disposed along a horizontal transfer direction, and a second horizontal transfer register configured to horizontally transfer a signal charge transferred from the plurality of vertical transfer registers via the first horizontal transfer register. The solid-state imaging element further includes a first transfer channel configured to be provided between the first transfer part and the vertical transfer register, a second transfer channel configured to be provided between the second transfer part and the second horizontal transfer register, and a channel stop region configured to be provided between the second transfer part and the imaging element area. In the solid-state imaging element, a signal charge transferred from the vertical transfer register via the first transfer channel to the first transfer part is transferred via the second transfer part to the second horizontal transfer register.

According to the first embodiment, signal charges transferred from the vertical transfer register via the first transfer channel to the first transfer part are transferred via the second transfer part to the second horizontal transfer register. Therefore, the electric field is modulated by the channel stop region connected to the imaging element area for the horizontal transfer register so as to be enhanced. Thus, the electric field in the vertical direction is enhanced, which can improve the efficiency of the transfer between the horizontal transfer registers. In addition, the effective transfer length in the transfer between the horizontal transfer registers can be shortened. This feature in addition to the enhancement of the electric field in the vertical direction due to the above-described electric field enhancement can contribute to an improvement in the transfer efficiency.

According to the second embodiment, signal charges transferred from the vertical transfer register via the first transfer channel to the first transfer part are transferred via the second transfer part to the second horizontal transfer register. Therefore, the electric field is modulated by the channel stop region connected to the imaging element area for the horizontal transfer register so as to be enhanced. Thus, the electric field in the vertical direction is enhanced, which can improve the efficiency of the transfer between the horizontal transfer registers. In addition, the effective transfer length in the transfer between the horizontal transfer registers can be shortened. This feature in addition to the enhancement of the electric field in the vertical direction due to the above-described electric field enhancement can contribute to an improvement in the transfer efficiency.

BRIEF DESCRIPTION OF THE DRAWINGS

FIGS. 4A and 4B are explanatory diagrams for operation of transfer between horizontal transfer registers;

FIGS. 9A to 9C are further explanatory diagrams for the operation of transfer between horizontal transfer registers;

FIG. 11 is a block diagram of another solid-state imaging device according to one embodiment of the invention;

DETAILED DESCRIPTION OF THE PREFERRED EMBODIMENTS

Figure 1:
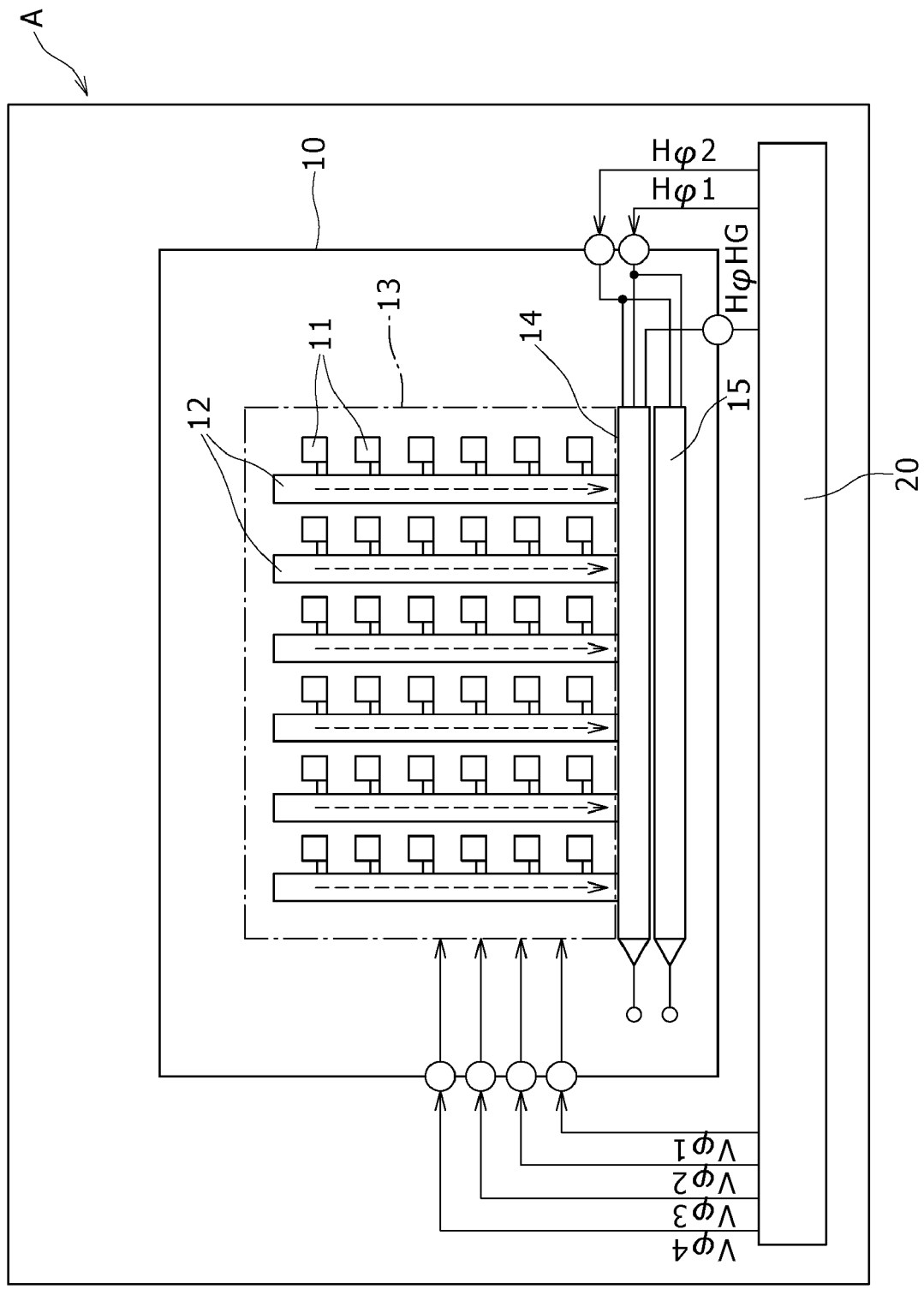
FIG. 1 is a block diagram of a solid-state imaging device according to one embodiment of the present invention.

A solid-state imaging element according to an embodiment of the present invention and a solid-state imaging device having the solid-state imaging element include an imaging element area that has photosensors and vertical transfer registers on a semiconductor substrate, a first horizontal transfer register that horizontally transfers signal charges transferred from the vertical transfer registers by a first transfer part and a second transfer part alternately disposed along the horizontal transfer direction, and a second horizontal transfer register that horizontally transfers signal charges transferred from the vertical transfer registers via the first horizontal transfer register.

Furthermore, the solid-state imaging element includes a first transfer channel provided between the first transfer part and the vertical transfer register, a second transfer channel provided between the second transfer part and the second horizontal transfer register, and a channel stop region provided between the second transfer part and the imaging element area. In the solid-state imaging element, signal charges transferred from the vertical transfer register via the first transfer channel to the first transfer part are transferred via the second transfer part to the second horizontal transfer register.

In this manner, the transfer of signal charges from the first horizontal transfer register to the second horizontal transfer register is implemented from the second transfer part, for which the channel stop region is provided between the second transfer part and the imaging element area and is connected to the imaging element area. Therefore, in the transfer of signal charges between the horizontal transfer registers, the electric field is modulated by the channel stop region connected to the imaging element area so as to be enhanced. Thus, the electric field in the vertical direction is enhanced, which can improve the efficiency of the transfer between the horizontal transfer registers. In addition, the effective transfer length in the transfer between the horizontal transfer registers can be shortened. This feature in addition to the enhancement of the electric field in the vertical direction due to the above-described electric field enhancement can contribute to an improvement in the transfer efficiency.

Furthermore, the second horizontal transfer register has a third transfer part and a fourth transfer part that are alternately disposed along the horizontal transfer direction. The third transfer part and the second transfer part are disposed so as to be adjacent to the first transfer part and the fourth transfer part, respectively, in the vertical transfer direction. In addition, the second transfer channel is provided between the second transfer part and the third transfer part.

Therefore, unlike in a configuration in which the second transfer channel is provided between the second transfer part and the fourth transfer part, operation for moving signal charges from the third transfer part to the fourth transfer part is unnecessary, which can improve the efficiency of transfer of signal charges from the vertical transfer registers.

Moreover, if a plurality of horizontal transfer register units each including the first horizontal transfer register and the second horizontal transfer register are provided, the frame rate can be further enhanced from a frame rate obtained due to the improvement in the efficiency of the transfer between the horizontal transfer registers.

An embodiment of the invention will be described below in detail based on the drawings. FIG. 1 is a block diagram of a solid-state imaging device A of the embodiment. The solid-state imaging device A of the present embodiment is a digital still camera referred to as a so-called digital camera. Note that the solid-state imaging device A is not limited to the digital still camera but may be a digital video camera or a camera unit incorporated into a cell phone.

FIG. 1 shows a solid-state imaging element 10 used for image capturing by the solid-state imaging device A, and a timing generator 20 that produces drive signals for driving the solid-state imaging element 10 at a predetermined timing. In addition to these components, the solid-state imaging device A includes a power supply unit such as a battery, a storage in which image data signals produced through imaging are stored, a controller that controls the entire solid-state imaging device A, and so on. According to FIG. 1, the circuit constructing these components other than the imaging element 10 and the timing generator 20 is formed as a separate circuit (formed on a chip other than the chip including the solid-state imaging element 10). However, the circuit may be provided on the same chip, or alternatively may be provided on several chips. The solid-state imaging element 10 of the present embodiment will be described as a so-called CCD solid-state imaging element.

The solid-state imaging element 10 is formed on a semiconductor substrate. Formed on the semiconductor substrate are plural photosensors 11 formed of photodiodes that are two-dimensionally arranged vertically and horizontally with predetermined distances, and plural vertical transfer registers 12 that vertically transfer, for each vertical column of the two-dimensionally arranged photosensors 11, signal charges arising from photoelectric conversion by the plural photosensors 11. In addition, formed on the semiconductor substrate are a first horizontal transfer register 14 that horizontally transfers signal charges transferred from the plural vertical transfer registers 12, and a second horizontal transfer register 15 that horizontally transfers signal charges transferred from the plural vertical transfer registers 12 via the first horizontal transfer register 14. The plural photosensors 11 and the plural vertical transfer registers 12 construct an imaging element area 13.

The first horizontal transfer register 14 and the second horizontal transfer register 15 are configured to horizontally transfer signal charges transferred from the vertical transfer registers 12 by a publicly-known two-phase drive system. The first and second horizontal transfer registers 14 and 15 are driven by a first horizontal transfer clock H$\phi$1 and a second horizontal transfer clock H$\phi$2 output from the timing generator 20. The vertical transfer registers 12 are driven by first to fourth vertical transfer clocks V$\phi$1 to V$\phi$4.

Figure 2A:
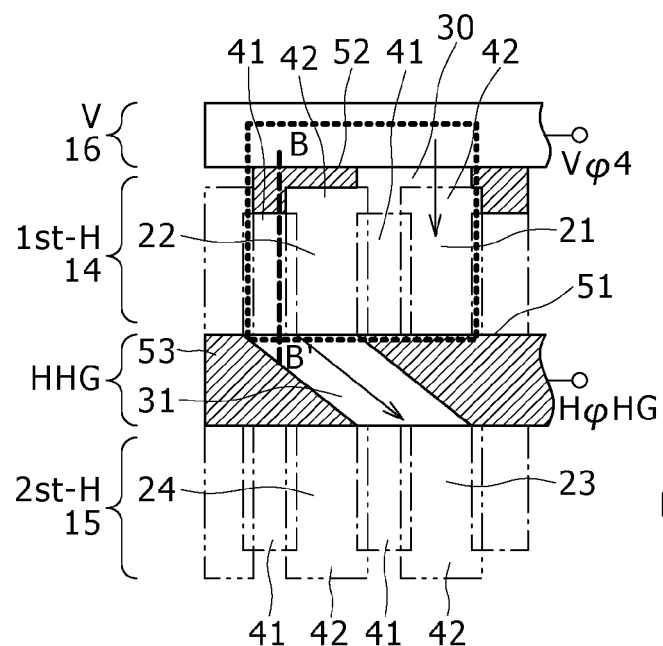
FIG. 2A is a diagram of a plane pattern in a solid-state imaging element and FIG. 2B is a diagram showing the potential state across the section along line B-B' in FIG. 2A.

FIG. 2A shows a plane pattern in the solid-state imaging element 10. Note that FIG. 2A shows only part of the first horizontal transfer register 14 and the second horizontal transfer register 15 for a simplified explanation.

As shown in FIG. 2A, the first horizontal transfer register 14 has first transfer parts 21 and second transfer parts 22 that are alternately disposed along the horizontal transfer direction. The second horizontal transfer register 15 has third transfer parts 23 and fourth transfer parts 24 that are alternately disposed along the horizontal transfer direction similarly. The third transfer part 23 and the second transfer part 22 are disposed so as to be adjacent to the first transfer part 21 and the fourth transfer part 24, respectively, in the vertical transfer direction.

Furthermore, as shown in FIG. 2A, accumulation gate electrodes 41 and transfer gate electrodes 42 are arranged in pairs continuously along the horizontal transfer direction. The first horizontal transfer clock H$\phi$1 and the second horizontal transfer clock H$\phi$2 are applied to these electrode pairs, which allow operation of the respective transfer parts. Specifically, the first transfer part 21 and the third transfer part 23 are operated by the first horizontal transfer clock H$\phi$1. The second transfer part 22 and the fourth transfer part 24 are operated by the second horizontal transfer clock H$\phi$2. Between the first horizontal transfer register 14 and the second horizontal transfer register 15, an inter-horizontal-register electrode HHG is provided.

A first transfer channel 30 is provided between the first transfer part 21 and the vertical transfer register 12. Due to the fourth vertical transfer clock V$\phi$4, signal charges from the vertical transfer register 12 are transferred via the first transfer channel 30 to the first transfer part 21.

Between the second transfer part 22 and the third transfer part 23, a second transfer channel 31 that is a channel for transfer between the horizontal transfer registers is provided. Due to an inter-horizontal-register transfer clock H$\phi$HG, signal charges from the vertical transfer register 12 are transferred via the second transfer part 22 and the first transfer channel 30 to the third transfer part 23.

Furthermore, channel stop regions 51, 52, and 53 are provided on the lower side of the first transfer part 21, on the upper side of the second transfer part 22, and on the upper side of the fourth transfer part 24, respectively. The channel stop region 52 isolates the second transfer part 22 from the imaging element area 13. The channel stop region 51 isolates the first transfer part 21 from the third transfer part 23.

Figure 2B:
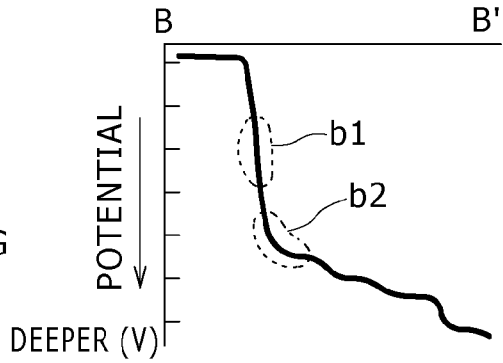

FIG. 2B shows the potential state across the section along line B-B' in FIG. 2A. Similarly to FIG. 15B, FIG. 2B is a typically employed diagram for showing the correlation between a section of a semiconductor element and the potential. The lower side in this diagram corresponds to a deeper potential (higher potential). As is apparent from a comparison between the potential state along line B-B' in FIG. 2B and that along line A-A' in FIG. 15B, the leg between points B and B' of FIG. 2A involves no part in which the electric field is weak like part a1 shown in FIG. 15B (see part b1 in FIG. 2B), and hence achieves an enhanced electric field.

Figure 15A:
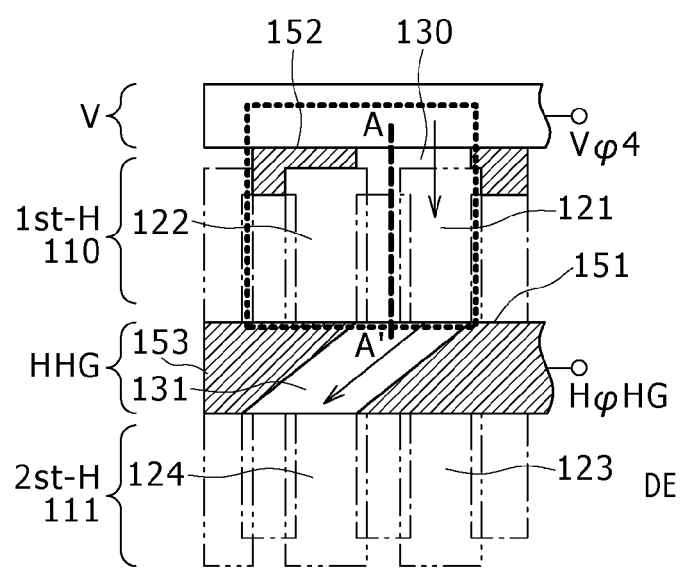
FIG. 15A is a diagram of a plane pattern in a solid-state imaging element in an existing solid-state imaging device and FIG. 15B is a diagram showing the potential state across the section along line A-A' in FIG. 15A.
Figure 15B:
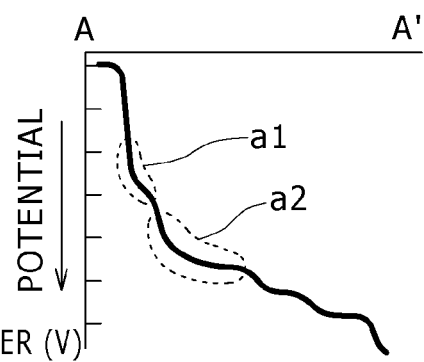

The reason why the leg between points A and A' in FIG. 15A involves part in which the electric field is weak such as part a1 shown in FIG. 15B is because the vertical transfer register is connected to the first transfer part 121 that implements transfer of signal charges between the horizontal transfer registers. Specifically, this connection weakens the electric field component in the vertical direction in the transfer from the first horizontal transfer register 110 to the second horizontal transfer register 111, which results in a decrease in the efficiency of the transfer between the horizontal transfer registers.

To solve this problem, the solid-state imaging element 10 of the present embodiment is configured so that transfer of signal charges between the horizontal transfer registers is implemented not from the first transfer part 21 connected to the vertical transfer register 12 but from the second transfer part 22 isolated from the imaging element area 13 by the channel stop region 52 therebetween. Specifically, signal charges are transferred between the horizontal transfer registers as follows: signal charges are transferred from the vertical transfer register 12 via the first transfer channel 30 to the first transfer part 21, followed by being transferred via the second transfer part 22 to the second horizontal transfer register 15. In this transfer way, the electric field is modulated by the channel stop region 52 so as to be enhanced. Thus, the electric field in the vertical direction is enhanced, which improves the efficiency of the transfer between the horizontal transfer registers.

Figure 3:
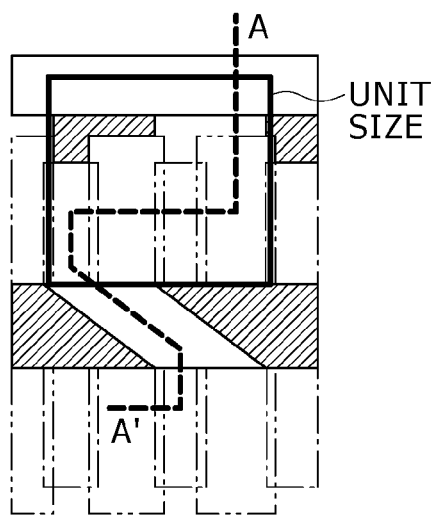
FIG. 3 is a diagram of a plane pattern in the solid-state imaging element.

A more specific description will be made below on the transfer of signal charges between the horizontal transfer registers with reference to diagrams. FIGS. 4A to 10C are diagrams for explaining the operation of transfer between the horizontal transfer registers. FIG. 4A shows a timing chart, and FIGS. 4B to 10C show the potential state across the section along line A-A' in FIG. 3. As described above, the first to fourth vertical transfer clocks V$\phi$1 to V$\phi$4 and the first and second horizontal transfer clocks H$\phi$1 and H$\phi$2 are produced by the timing generator 20 and input to the solid-state imaging element 10. FIG. 3 shows a plane pattern in the solid-state imaging element 10 similarly to FIG. 2A.

FIG. 4B shows the state where signal charges of a first horizontal line (hereinafter, referred to as "first signal charges") arising from photoelectric conversion by the photosensors 11 have been transferred to the vertical transfer register 12 and accumulated in a V1-part operated by the first vertical transfer clock V$\phi$1 and a V2-part operated by the second vertical transfer clock V$\phi$2 (t0). When, in this state, the third vertical transfer clock V$\phi$3 rises up and is turned to the high level at timing t1, the potential of a V3-part operated by the third vertical transfer clock V$\phi$3 is lowered, so that part of the first signal charges is moved to the V3-part (see FIG. 5A).

Figures 5A, 5B, 5C:
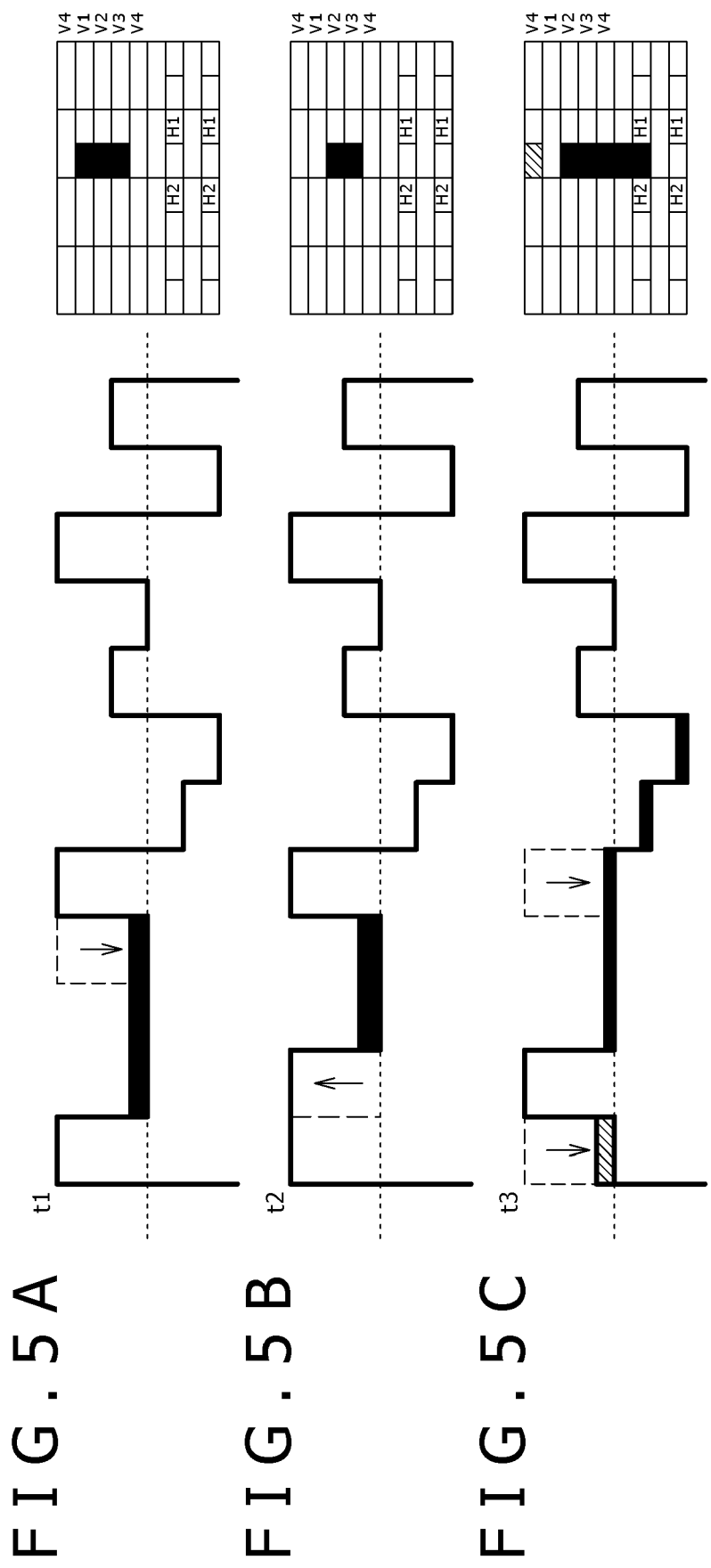
FIGS. 5A to 5C are another explanatory diagrams for the operation of transfer between horizontal transfer registers.
Figures 6A, 6B, 6C:
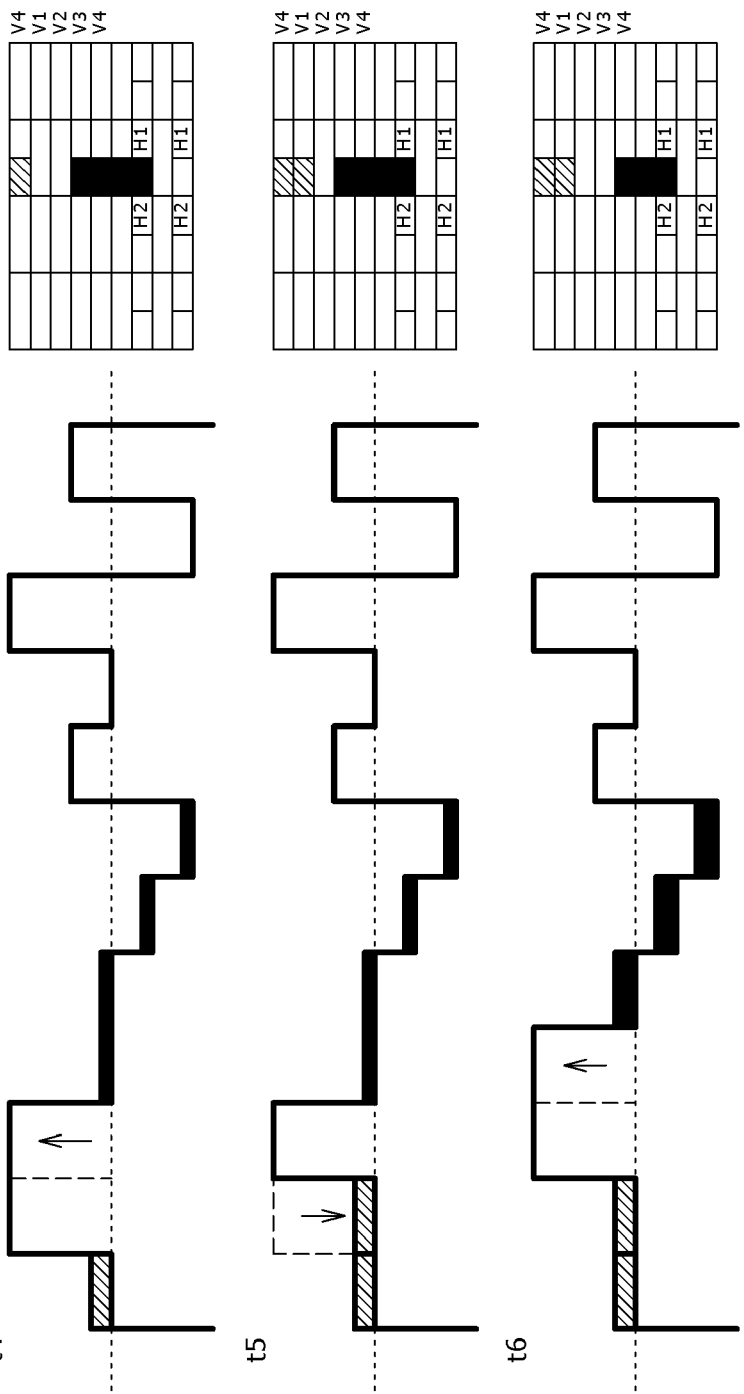
FIGS. 6A to 6C are further explanatory diagrams for the operation of transfer between horizontal transfer registers.
Figures 7A, 7B, 7C:
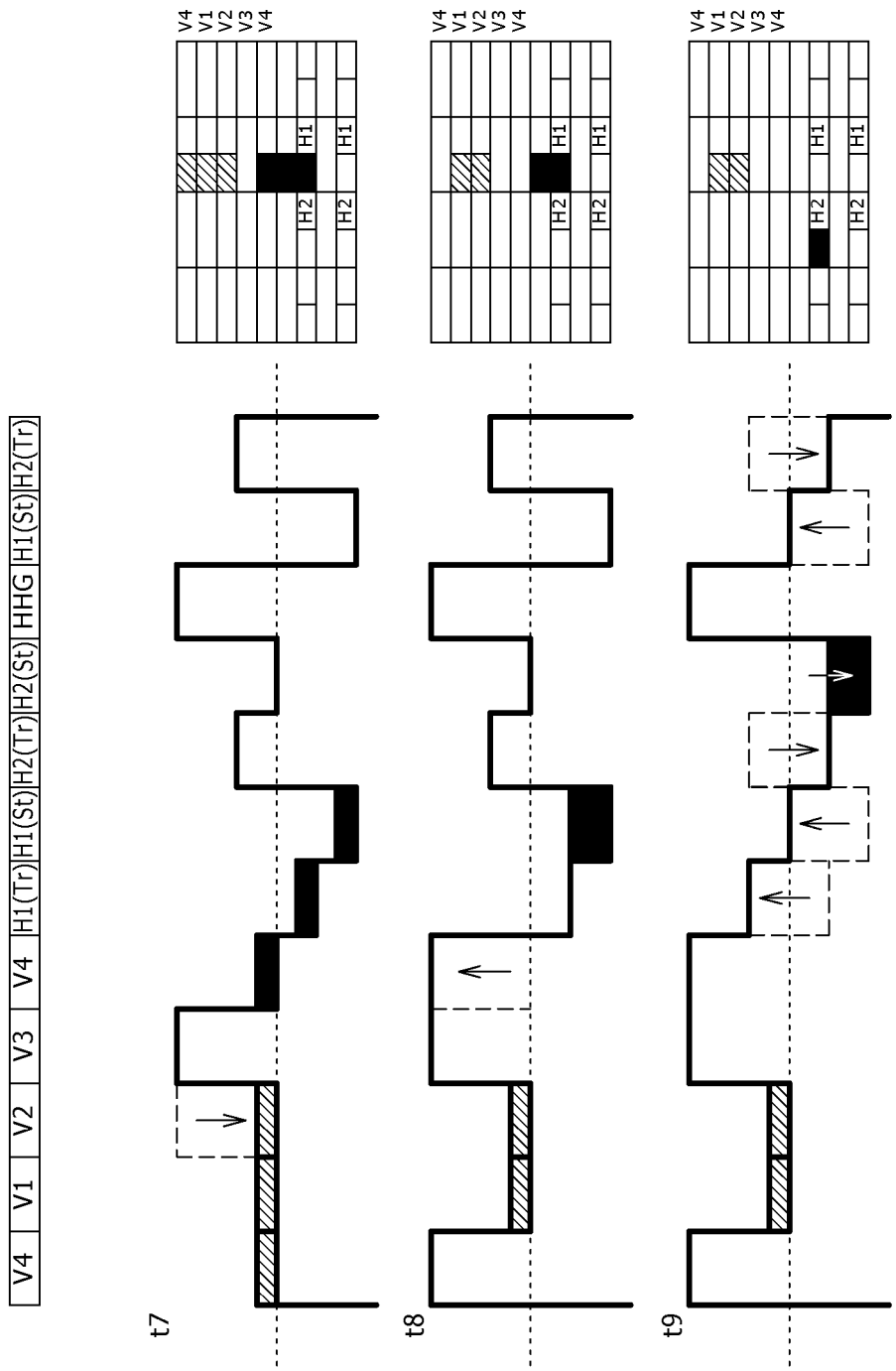
FIGS. 7A to 7C are further explanatory diagrams for the operation of transfer between horizontal transfer registers.

When the first vertical transfer clock V$\phi$1 falls down and is turned to the low level at timing t2, the potential of the V1-part is increased, which leads to the state where the first signal charges are accumulated in the V2-part and the V3-part (see FIG. 5B). When, in this state, the fourth vertical transfer clock V$\phi$4 rises up and is turned to the high level at timing t3, the potential of a V4-part as the final stage of the vertical transfer register is lowered, which starts transfer of the first signal charges to the first transfer part 21 via the V4-part (see FIG. 5C). Furthermore, signal charges of a second horizontal line (hereinafter, referred to as "second signal charges") arising from photoelectric conversion by the photosensors 11 are transferred to a previous-stage V4-part.

Subsequently, the second vertical transfer clock V$\phi$2 is turned to the low level at timing t4. Thus, the potential of the V2-part is increased and hence the first signal charges are completely transferred from the V2-part (see FIG. 6A). At timing t5, the first vertical transfer clock V$\phi$1 is turned to the high level. Therefore, the potential of the V1-part is lowered and thus the second signal charges are accumulated in the V1-part and the V2-part (see FIG. 6B).

At timing t6, the third vertical transfer clock V$\phi$3 is turned to the low level, which increases the potential of the V3-part. Thus, the first signal charges are completely transferred from the V3-part (see FIG. 6C). Subsequently, when the second vertical transfer clock V$\phi$2 is turned to the high level at timing t7, the potential of the V2-part is lowered, and thus the second signal charges are accumulated in the V1-part, the V2-part, and the V4-part (see FIG. 7A).

Subsequently, at timing t8, the fourth vertical transfer clock V$\phi$4 is turned to the low level, which increases the potential of the V4-part. Thus, the first signal charges are transferred to a stress part (H1(St)) of the first transfer part 21, while the second signal charges are accumulated in the V1-part and the V2-part (see FIG. 7B).

After the transfer of the first signal charges to the first transfer part 21, the first horizontal transfer clock H$\phi$1 is turned to the low level while the second horizontal transfer clock Hφ2 is turned to the high level at timing t9. Due to this operation, the potentials of the first transfer part 21 and the third transfer part 23 are increased, while the potentials of the second transfer part 22 and the fourth transfer part 24 are lowered. Thus, the first signal charges are moved from the first transfer part 21 to a stress part (H2(St)) of the second transfer part 22 (see FIG. 7C).

After the first signal charges are thus transferred to the second transfer part 22, the potential of the inter-horizontal-register electrode HHG is turned to the high level at timing t10. Therefore, the potential of the second transfer channel 31 is lowered, and thus part of the first signal charges is moved to the second transfer channel 31. In addition, at the timing t10, the third vertical transfer clock Vφ3 is turned to the high level. Therefore, the potential of the V3-part is lowered and thus the second signal charges are accumulated in the V1-part, the V2-part, and the V3-part (see FIG. 8A). Subsequently, at timing t11, the second horizontal transfer clock Hφ2 is turned to the low level. Thus, the potentials of the second transfer part 22 and the fourth transfer part 24 are increased, which moves the first signal charges to the second transfer channel 31 (FIG. 8B).

Figures 8A, 8B, 8C:
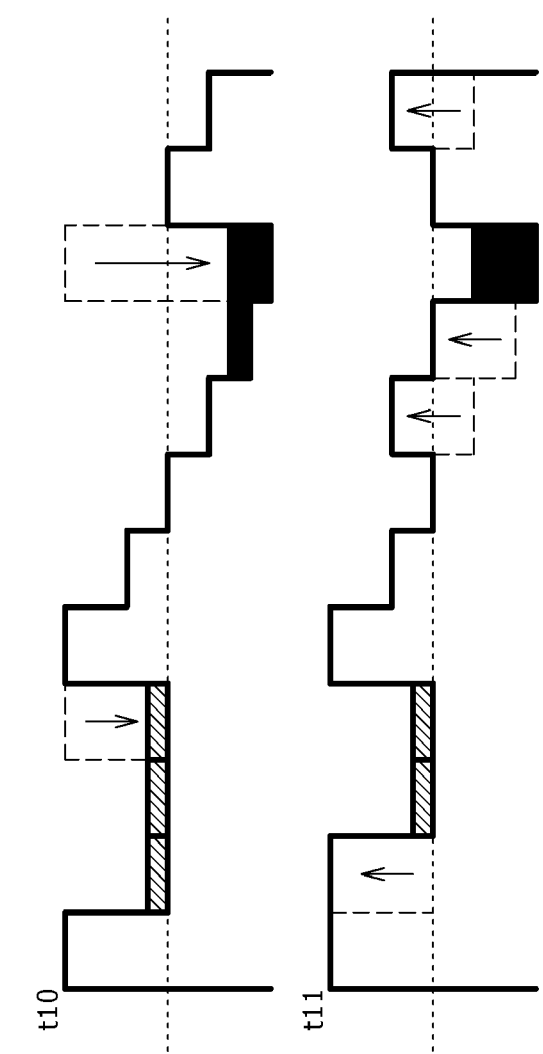
FIGS. 8A to 8C are further explanatory diagrams for the operation of transfer between horizontal transfer registers.
Figures 10A, 10B, 10C:
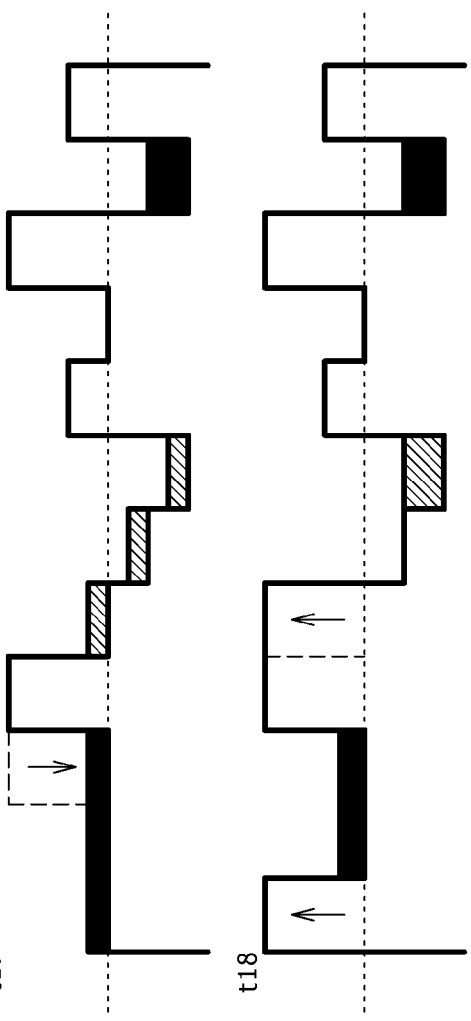
FIGS. 10A to 10C are further explanatory diagrams for the operation of transfer between horizontal transfer registers.

Thereafter, at timing t12, the first horizontal transfer clock Hφ1 is turned to the high level, which starts transfer of the first signal charges from the second transfer channel 31 to the third transfer part 23 (FIG. 8C). At timing t13, the potential of the inter-horizontal-register electrode HHG is turned to the low level, which completes the transfer of the first signal charges from the second transfer channel 31 to the third transfer part 23 (FIG. 9A).

Furthermore, the second signal charges are transferred to the stress part (H1(St)) of the first transfer part 21 through operation similar to the operation from the timing t4 to t8 for the first signal charges (see FIGS. 9B to 10C).

As described above, in the solid-state imaging element 10 of the present embodiment, signal charges are transferred between the horizontal transfer registers in such a manner that signal charges transferred from the vertical transfer register 12 to the first transfer part 21 are transferred via the second transfer part 22 to the second horizontal transfer register 15. Therefore, the electric field is modulated by the channel stop region 52 so as to be enhanced. Thus, the electric field in the vertical direction is enhanced, which can improve the efficiency of the transfer between the horizontal transfer registers.

Furthermore, another configuration like a solid-state imaging element 10' in a solid-state imaging device A' shown in FIG. 11 is also available. Specifically, in the solid-state imaging element 10', a horizontal transfer register unit composed of a first horizontal transfer register and a second horizontal transfer register is disposed on each of the upper side and lower side of an imaging element area 13 so that signal charges are transferred to the upper and lower horizontal transfer register units alternately on each column basis. More specifically, a first horizontal transfer register 14a and a second horizontal transfer register 15a horizontally transfer signal charges transferred from vertical transfer registers 12 on odd-numbered vertical lines. In contrast, a first horizontal transfer register 14b and a second horizontal transfer register 15b horizontally transfer signal charges transferred from the vertical transfer registers 12 on even-numbered vertical lines.

In this manner, signal charges on odd-numbered vertical lines and signal charges on even-numbered vertical lines are simultaneously transferred by these separate horizontal transfer register units so that the amount of signal charges horizontally transferred in 1 H by each of the horizontal transfer register units is small, to thereby achieve a higher frame rate. Furthermore, signal charges on an odd-numbered horizontal line and signal charges on an even-numbered horizontal line are simultaneously transferred by the first and second horizontal transfer registers so that the signal charges of two lines are read out within 1 H, to thereby achieve a higher frame rate.

Figure 12:
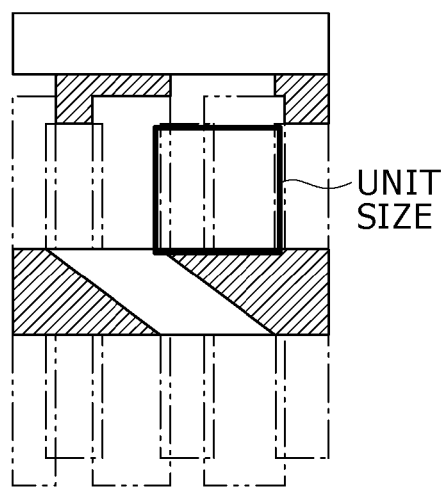
FIG. 12 is a diagram of a plane pattern in a solid-state imaging element in the solid-state imaging device of FIG. 11.
Figure 13:
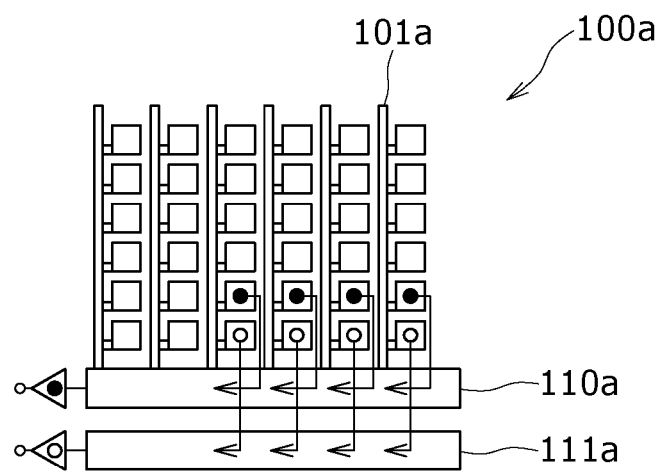
FIG. 13 is a block diagram of an existing solid-state imaging device.
Figure 14:
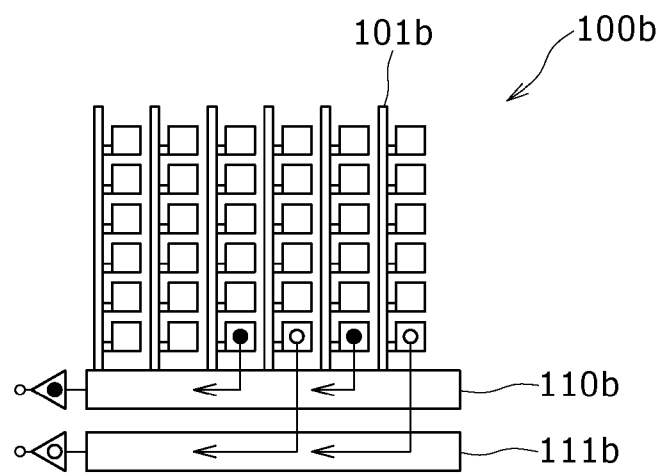
FIG. 14 is a block diagram of another existing solid-state imaging device.

In addition, in the horizontal transfer register configuration of the solid-state imaging element 10', only either one of the first transfer part 21 and the second transfer part 22 is disposed in one unit size as shown in FIG. 12, unlike the configuration of FIG. 2A, in which the first transfer part 21 and the second transfer part 22 are disposed in one unit size (substantially the same as the size of the photosensor 11). Therefore, a channel stop region that completely covers the second transfer part 22 can be formed. Accordingly, in the solid-state imaging device A', the electric field from the channel stop region 52 is further enhanced and thus the transfer efficiency is further improved compared with in the solid-state imaging device A.

Embodiments of the present invention can be applied not only to a configuration in which signal charges are transferred downward from all columns like the solid-state imaging device A and a configuration in which signal charges are transferred upward and downward alternately on each column basis like the solid-state imaging device A', but also to a configuration in which signal charges are transferred upward and downward alternately on each row basis. Furthermore, embodiments of the invention can be applied also to a configuration in which vertical transfer registers and horizontal transfer registers are rotated by 90 degrees so that signal charges are transferred toward the left and right sides alternately on each column basis or each row basis.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging element comprising:
an imaging element area configured to include a plurality of two-dimensionally arranged photosensors and a plurality of vertical transfer registers that vertically transfer a signal charge arising from photoelectric conversion by the plurality of photosensors for each vertical column of the two-dimensionally arranged photosensors;
a first horizontal transfer register configured to horizontally transfer a signal charge transferred from the plurality of vertical transfer registers by a first transfer part and a second transfer part that are alternately disposed along a horizontal transfer direction;
a second horizontal transfer register configured to horizontally transfer a signal charge transferred from the plurality of vertical transfer registers via the first horizontal transfer register;
a first transfer channel configured to be provided between the first transfer part and the vertical transfer register;
a second transfer channel configured to be provided between the second transfer part and the second horizontal transfer register; and
a channel stop region configured to be provided between the second transfer part and the imaging element area, wherein
a signal charge transferred from the vertical transfer register via the first transfer channel to the first transfer part is transferred via the second transfer part to the second horizontal transfer register.

2. The solid-state imaging element according to claim 1, wherein
the second horizontal transfer register includes a third transfer part and a fourth transfer part that are alternately disposed along the horizontal transfer direction, and
the third transfer part is disposed so as to be adjacent to the first transfer part in a vertical transfer direction and the second transfer part is disposed so as to be adjacent to the fourth transfer part in the vertical transfer direction, and the second transfer channel is provided between the second transfer part and the third transfer part.

3. The solid-state imaging element according to claim 1 or claim 2, wherein
a plurality of horizontal transfer register units each including the first horizontal transfer register and the second horizontal transfer register are provided.

4. A solid-state imaging device including a solid-state imaging element, the imaging element comprising:
an imaging element area configured to include a plurality of two-dimensionally arranged photosensors and a plurality of vertical transfer registers that vertically transfer a signal charge arising from photoelectric conversion by the plurality of photosensors for each vertical column of the two-dimensionally arranged photosensors;
a first horizontal transfer register configured to horizontally transfer a signal charge transferred from the plurality of vertical transfer registers by a first transfer part and a second transfer part that are alternately disposed along a horizontal transfer direction;
a second horizontal transfer register configured to horizontally transfer a signal charge transferred from the plurality of vertical transfer registers via the first horizontal transfer register;
a first transfer channel configured to be provided between the first transfer part and the vertical transfer register;
a second transfer channel configured to be provided between the second transfer part and the second horizontal transfer register; and
a channel stop region configured to be provided between the second transfer part and the imaging element area, wherein
a signal charge transferred from the vertical transfer register via the first transfer channel to the first transfer part is transferred via the second transfer part to the second horizontal transfer register.

* * * * *